United States Patent [19]
Klein

[11] Patent Number: 5,431,377
[45] Date of Patent: Jul. 11, 1995

[54] ONE-PIECE PARTITION FOR A HYDRAULIC ENGINE MOUNT

[75] Inventor: Robert R. Klein, Centerville, Ohio

[73] Assignee: General Motors Corporation, Detroit, Mich.

[21] Appl. No.: 109,022

[22] Filed: Aug. 19, 1993

[51] Int. Cl.$^6$ ............................................. F16F 13/00
[52] U.S. Cl. ............................................. 267/140.13
[58] Field of Search ............... 267/140.13, 140.11, 267/219; 248/562, 636, 638; 180/300, 312, 902

[56] References Cited

U.S. PATENT DOCUMENTS

| | | | |
|---|---|---|---|
| 4,469,316 | 9/1984 | van den Boom et al. | 267/140.13 |
| 4,588,173 | 5/1986 | Gold et al. | 267/140.13 |
| 4,632,370 | 12/1986 | Ticks et al. | 267/140.13 X |
| 4,907,786 | 3/1990 | Okazaki et al. | 267/140.13 |
| 5,085,413 | 2/1992 | Freudenberg et al. | 267/140.13 |
| 5,205,545 | 4/1993 | Quast | 267/140.13 |

FOREIGN PATENT DOCUMENTS

| | | | |
|---|---|---|---|
| 7200742 | 12/1982 | Japan | 267/140.13 |
| 8037337 | 3/1983 | Japan | 267/140.13 |
| 3266238 | 11/1988 | Japan | 267/140.13 |

*Primary Examiner*—Josie A. Ballato
*Attorney, Agent, or Firm*—Anthony Luke Simon

[57] ABSTRACT

A hydraulic mount assembly includes an elastomeric hollow body connected to a pair of opposed mounting members. A one-piece partition cooperates with the body and forms a closed cavity that is filled with a damping fluid. The partition includes a fluid chamber bounded by spaced upper and lower walls. A resilient flange provided around the periphery of the partition reciprocally supports the partition between the mounting members. An orifice track formed in the partition provides fluid communication between the cavity and the fluid chamber.

2 Claims, 1 Drawing Sheet

ONE-PIECE PARTITION FOR A HYDRAULIC ENGINE MOUNT

BACKGROUND OF THE INVENTION

1. FIELD OF THE INVENTION

The present invention relates generally to hydraulic mount assemblies for vibration damping, and in particular, is concerned with a one-piece partition having a peripheral, resilient flange for use inside a hydraulic engine mount assembly.

2. DESCRIPTION OF THE RELATED ART

A variety of mount assemblies are presently available to isolate vehicle vibrations, such as for automobile and truck engines and transmissions. A popular mount is the hydraulic mount of the type disclosed in U.S. Pat. No. 4,588,173 to Gold et al., issued May 13, 1986, titled "Hydraulic-Elastomeric Mount" and assigned to the assignee of the present invention.

The hydraulic mount assembly of U.S. Pat. No. 4,588,173 includes a reinforced, hollow rubber body that is closed by a resilient diaphragm so as to form a cavity. This cavity is partitioned by an assembly of upper and lower plates into two chambers that are in fluid communication through a relatively large central opening in the plate assembly. A first or primary fluid chamber is formed between the plate assembly and the body. A secondary chamber is formed between the plate assembly and the diaphragm.

A decoupler is positioned in the central opening of the plate assembly and reciprocates in response to the vibrations. The decoupler movement alone accommodates small volume changes in the two chambers. For example, when the decoupler moves in a direction toward the diaphragm, the volume of the portion of the decoupler cavity in the primary chamber increases and the volume of the portion in the secondary chamber correspondingly decreases, and vice-versa. In this manner, fluid flow between the chambers is substantially avoided for certain small vibratory amplitudes that generally occur at higher frequencies. Thus, the freely floating decoupler is a passive tuning device.

In addition to the relatively large central opening, an orifice track with a smaller, restricted flow passage is provided around the perimeter of the plate assembly. Each end of the track has an opening. An inlet opening communicates with the primary chamber, while an outlet opening communicates with the secondary chamber. The orifice track provides a second passive tuning component, and when combined with the decoupler, provides at least three distinct dynamic operating modes. The particular operating mode is primarily determined by the flow of fluid between the two chambers.

More specifically, small amplitude vibrating input, such as from relatively smooth engine idling or the like, produces no damping due to the action of the decoupler, as explained above. Large amplitude vibrating input, such as heavy engine loading during sudden accelerations or panic stops, produces high velocity fluid flow through the orifice track, and accordingly, a high level of damping force and desirable smoothing actions. A third or intermediate operations mode of the mount assembly occurs during medium amplitude inputs experienced in normal driving and resulting in lower velocity fluid flow through the orifice track. In response to the decoupler switching from movement in one direction to another in each of the modes, a limited amount of fluid can bypass the orifice track by moving round the edges of the decoupler and through the central opening, thereby smoothing the transition.

While this basic mount design has proved successful, the art continues to seek improvements. It is desirable to reduce the weight of a mount assembly and the costs associated with tooling, material handling and assembly of the mount components.

SUMMARY OF THE INVENTION

The present invention includes a hydraulic mount assembly particularly suited for use with automotive engines and transmissions. A one-piece elastomeric partition according to the present invention replaces four components found in a conventional mount: upper and lower orifice plates, an elastomeric diaphragm, and a decoupler. The one-piece partition reduces the weight of the mount assembly and provides superior design flexibility for damping tracks to improve isolation from vibrations at difficult frequencies.

In a preferred embodiment, a hydraulic mount assembly includes an elastomeric hollow body connected to a pair of opposed mounting members. A one-piece partition cooperates with the body and forms a closed cavity that is filled with a damping fluid. The partition includes a fluid chamber bounded by spaced upper and lower walls. A resilient flange provided around the periphery of the partition reciprocally supports the partition between the mounting members. An orifice track formed in the partition provides fluid communication between the cavity and the fluid chamber.

DETAILED DESCRIPTION OF THE PREFERRED EMBODIMENT

Figure 1:
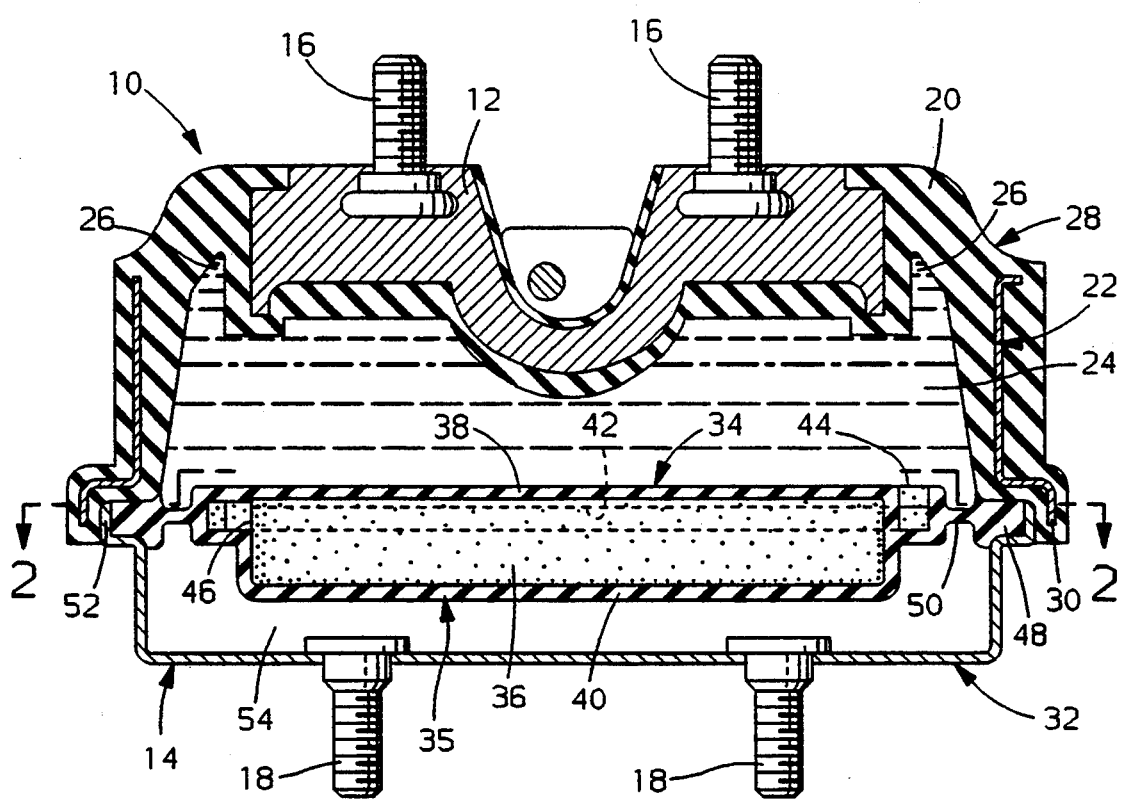
FIG. 1 is a sectional view of a hydraulic mount assembly having a one-piece partition between upper and lower mounting members according to the present invention.
Figure 2:
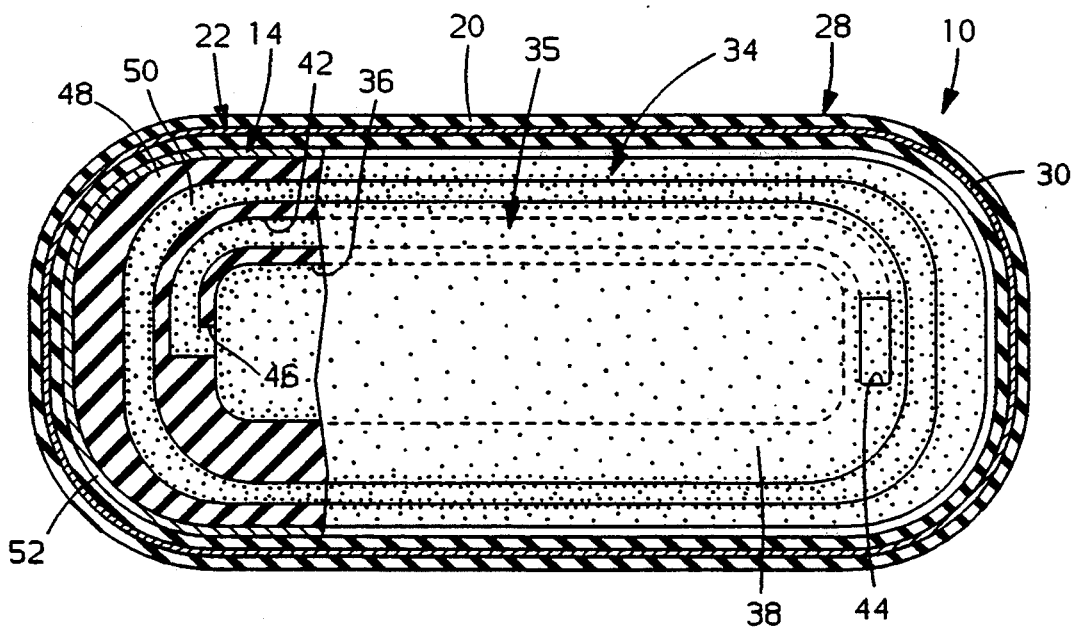
FIG. 2 is a top plan view taken along line 2—2 of FIG. 1 of the one-piece partition with a portion removed to illustrate an internal orifice track and fluid chamber in a central body having a peripheral flange and rim.

A hydraulic elastomeric mount assembly is indicated generally at (10) in FIG. 1. The mount assembly (10) is particularly adapted for mounting an internal combustion engine and/or transmission or similar component in a vehicle. The dynamic characteristics of the mount assembly (10) are tuned to meet the needs of the specific application. As a result, the desired dynamic rate best suited to isolate a particular range of vibration/noise conditions may be obtained.

The mount assembly (10) includes a cast aluminum mounting member (12) and a stamped sheet metal mounting member or baseplate (14). The mounting members (12) and (14) each have a pair of studs (16) and (18), respectively. Studs (16) and (18) project outwardly from the mounting members (12) and (14) for respective attachment to an engine (not illustrated) and an engine supporting member such as a cradle or frame (not illustrated) of a vehicle.

A hollow elastomeric body (20) interconnects the mounting members (12) and (14). The body (20) is preferably constructed of natural or synthetic rubber. More specifically, the body (20) may be molded to and about the mounting member (12) and to both the interior and exterior of a stamped sheet metal retainer (22). The body (20) is configured to form a hollow cavity (24) for receiving a damping liquid, such as a commercial engine antifreeze coolant.

Voids (26) are provided in the inner surface of the body (20) to assist in providing directional dynamic rate control within the elastomeric body (20) and are part of the damping liquid cavity (24). As is known in the art, such voids (26) are especially useful in isolating certain internal combustion engine vibrations.

The mounting member (12), elastomeric body (20) and metal retainer (22) cooperate to form a first subassembly or cover (28) of the mount assembly (10). The retainer (22) includes an outwardly projecting collar (30) at its lower periphery. The collar (30) is formed to receive a second subassembly or base (32) formed by the mounting member (14) and an elastomeric partition indicated generally at (34).

The partition (34) is preferably a one-piece member having a central body (35) containing a fluid chamber (36) bounded by an upper wall (38) spaced from a lower wall (40). An orifice track (42) having an inlet (44) in the upper wall (38) and an outlet (46) at the fluid chamber (36) provides fluid communication between the cavity (24) and the chamber (36). The geometry and length of the orifice track (42) can be varied as desired to provide a particular operating characteristic.

A rim (48) provided about the periphery of the partition (34) is connected to the central body (35) by a resilient, spring-like peripheral flange (50). The thickness of the resilient flange (50) is less than the thickness of the rim (48). The rim (48) is received in an outwardly projecting collar (52) of the mounting member (14) and held in place between collar (30) and body (20) when the subassemblies (28) and (32) are secured together. The resilient flange (50) permits the partition (34) to vibrate freely (reciprocate) and deflect for small amplitude inputs to the mount assembly (10). When large amplitude inputs are received, the flange (50) reaches its deflection limit, thus forcing fluid through the orifice track (42).

Preferably, the lower wall (40) of the partition (34) is resiliently formed so as to stretch when accommodating fluid in the chamber (36) during large amplitude inputs, thereby resembling a flexible diaphragm used in many conventional hydraulic mount assemblies. The lower wall (40) stretches during large amplitude inputs after fluid has traveled through the orifice track (42) since pressure in an air chamber (54) between the partition (34) and the mounting member (14) is lower than the pressure on the upper wall (38) in fluid communication with the cavity (24).

Various modifications can be made to tune the partition (34) for specific requirements. For example, multiple orifice tracks can be formed in the partition (34) to provide tunable paths between the cavity (24) and the chamber (36). Also, convolutions can be provided in the lower wall (40) to enhance compliance in the lower wall (40) as it expands. Additionally, bumpers can be provided on the exterior surfaces of the upper and lower walls (38,40) to cushion the partition (34) when it bottoms-out against the mounting members (12) and (14) during large amplitude inputs.

The partition (34) as illustrated may be made completely from a thermo-plastic elastomer (TPE). In other embodiments, a lower wall (40) formed from rubber or the like can be molded to a partition otherwise formed from TPE or a similar material. Also, the flange (50) can be formed from rubber along with the lower wall (40) and then molded to a partition otherwise formed from TPE.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A hydraulic mount apparatus comprising:
   a first mount assembly;
   a second mount assembly secured to the first mount assembly forming an interior cavity;
   a partition mounted between the first and second mount assemblies, dividing the interior cavity into first and second fluid chambers, wherein the partition comprises
      a body including a third fluid chamber bounded by first and second walls,
      at least one orifice,
      a rim about a periphery of the partition, wherein the rim mounts the body between the first and second mount assemblies,
      a resilient flange connecting the body to the rim, wherein the body is surrounded by and suspended by only the rim and the resilient flange, wherein the resilient flange permits the entire body within the periphery of the partition to vibrate freely and permits stretching of at least one of the first and second walls, wherein the resilient flange has a first thickness less than a second thickness of the rim,
   wherein the first and third fluid chambers are at least substantially filled with hydraulic fluid and are fluid connected by the orifice, wherein the second fluid chamber is substantially filled with a gas and is not in fluid communication with the first and third fluid chambers and wherein the entire partition is resilient.

2. The hydraulic mount apparatus of claim 1, wherein:
   the partition, including the rim, resilient flange and body, consists only of a set of elastomeric bodies molded together, wherein the set of elastomeric bodies comprises at least two elastomeric bodies.

* * * * *